United States Patent
Kushner

(10) Patent No.: US 6,237,618 B1
(45) Date of Patent: May 29, 2001

(54) SYSTEM AND METHOD FOR CONTROLLING THE UNWANTED FLOW OF WATER THROUGH A WATER SUPPLY LINE

(76) Inventor: Nicholas D. Kushner, 701 Merion Ave., Havertown, PA (US) 19083

( * ) Notice: Subject to any disclaimer, the term of this patent is extended or adjusted under 35 U.S.C. 154(b) by 0 days.

(21) Appl. No.: 09/611,047

(22) Filed: Jul. 6, 2000

(51) Int. Cl.⁷ .............................. E03B 7/00; F16K 31/02
(52) U.S. Cl. ...................... 137/1; 137/624.11; 137/487.5
(58) Field of Search .................. 137/624.11, 624.12, 137/487.5, 1

(56) References Cited

U.S. PATENT DOCUMENTS

| | | |
|---|---|---|
| 4,845,472 | 7/1989 | Gordon . |
| 5,251,653 * | 10/1993 | Tucker et al. .................. 137/487.5 X |
| 5,267,587 * | 12/1993 | Brown .............................. 137/624.12 |
| 5,287,884 * | 2/1994 | Cohen .......................... 137/624.12 X |
| 5,347,264 | 9/1994 | Bjorkman . |
| 5,539,384 | 7/1996 | Frazier . |
| 5,568,825 * | 10/1996 | Faulk ............................... 137/624.11 |
| 5,655,561 | 8/1997 | Wendel et al. . |
| 5,979,493 * | 11/1999 | Simpkins, Jr. .............. 137/624.11 X |

* cited by examiner

Primary Examiner—Kevin Lee
(74) Attorney, Agent, or Firm—LaMorte & Associates

(57) ABSTRACT

A system and method for controlling the flow of water through a water supply line into a building. The system has a valve that connects to the water supply line of the building. The system also includes a flow meter that connects to the water supply line, wherein the flow meter produces a water flow signal indicative of the volume of water flowing through the water supply line. A systems controller is provided that is connected to both the valve and the flow meter. The systems controller is configurable between a first operations mode and a second operations mode. The systems controller reads the water flow signal from the flow meter and closes the valve at a first flow rate when it is in its first operations mode. Similarly, the systems controller closes the valve at a second flow rate when it is in its second operations mode. When the flow meter detects an excessive volume flow, the systems controller only closes the valve if the excessive flow persists beyond a predetermined period of time. The predetermined period of time has a duration of at least ten seconds.

17 Claims, 3 Drawing Sheets

SYSTEM AND METHOD FOR CONTROLLING THE UNWANTED FLOW OF WATER THROUGH A WATER SUPPLY LINE

BACKGROUND OF THE INVENTION

1. Field of the Invention

The present invention relates to systems and methods of controlling the flow of water through a water supply line into a residential or commercial structure. More particularly, the present invention relates to systems and methods that enable or prevent the flow of water through supply piping depending upon a variety of external conditions.

2. Prior Art Statement

Water is supplied to most residential and commercial structures through the use of underground water supply lines. The water supply lines receive water from either a municipal source or a private well. Once the underground water supply lines enter a building, they interconnect with the water supply plumbing within that structure. The supply plumbing leads to toilets, sinks, washing machines, dish washers and the like.

The water supplied to a building through a water supply line is typically under pressure. As such, if a leak were to occur in the supply plumbing or in the fixtures that terminate the supply plumbing, water would continue to leak into that building indefinitely. Accordingly, even small leaks can result in substantial volumes of water being released over time. As such, even small leaks can cause flooding or other structural damage to a building.

Flooding caused by leaking plumbing or broken water fixtures causes millions of dollars worth of damage each year. To help reduce the incidence of such types of flooding, prior art devices have been developed that help reduce the amount of damage caused by such flooding.

U.S. Pat. No. 4,845,472 to Gordon, entitled Leak Sensing Alarm And Supply Shut-Off Apparatus, and U.S. Pat. No. 5,655,561 to Wendel, entitled Wireless System For Detecting And Stopping Leaks, both show systems that use water sensors to detect a leak. Once water is detected on the ground by a sensor, the system automatically shuts off the flow of water into the building. The problem with such systems is that leaks do not always occur near a water sensor. Accordingly, significant flooding and damage can occur prior to water flowing to one of the water sensors.

U.S. Pat. No. 5,539,384 to Frasier, entitled Electronic Water Utility Safety Apparatus, shows an anti-flooding system that monitors the flow of water through the water supply line of a building. If the flow of water surpasses a maximum threshold, then the flow of water is automatically halted.

A problem with such prior art systems is that very small leaks often occur in plumbing. The small leaks usually do not result in a flow of water that exceeds a maximum threshold. As such, such prior art systems are ineffective in preventing damage from small leaks.

U.S. Pat. No. 5,347,264 to Bjorkman, entitled Method And Apparatus For Automatically Controlling A Water Supply Using Movement Detection Means, shows a system that uses the burglar alarm system of a home to control water flow. The burglar alarm system has motion sensors in the various rooms of the house. If no motion is detected in the house, the flow of water into the house is stopped. If the burglar alarm system detects a person in the house, water is permitted to flow as normal.

Such a system has many disadvantages. The system prevents dishwashers, washing machines and automated lawn sprinklers from activating when a person is not at home or is asleep. Furthermore, it requires that the burglar alarm system of the home be modified with additional sensors so that the system can detect when a person is in a shower or using the toilet.

In view of the complexities of prior art systems, a need clearly exists for a simple, low cost system and method that can stop the flow of water when a leak develops, yet does not interfere with the flow of water during everyday use. This need is met by the present invention as described and claimed below.

SUMMARY OF THE INVENTION

The present invention is a system and method for controlling the flow of water through a water supply line into a building. The system has a valve that connects to the water supply line of the building. The system also includes a flow meter that connects to the water supply line, wherein the flow meter produces a water flow signal indicative of the volume of water flowing through the water supply line. A systems controller is provided that is connected to both the valve and the flow meter. The systems controller is configurable between a first operations mode and a second operations mode. The systems controller reads the water flow signal from the flow meter and closes the valve at a first flow rate when it is in its first operations mode. Similarly, the systems controller closes the valve at a second flow rate when it is in its second operations mode.

When the flow meter detects an excessive volume flow, the systems controller only closes the valve if the excessive flow persists beyond a predetermined period of time. The predetermined period of time has a duration of at least ten seconds.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention system and method can be used to limit flood damage in any type of commercial building or structure, the present invention system and method is particularly well suited for preventing flood damage in a residential home. As a result, an exemplary embodiment of the present invention system is shown where the system is applied to the plumbing of a residential home in order to set forth the best mode contemplated for the invention.

Figure 1:
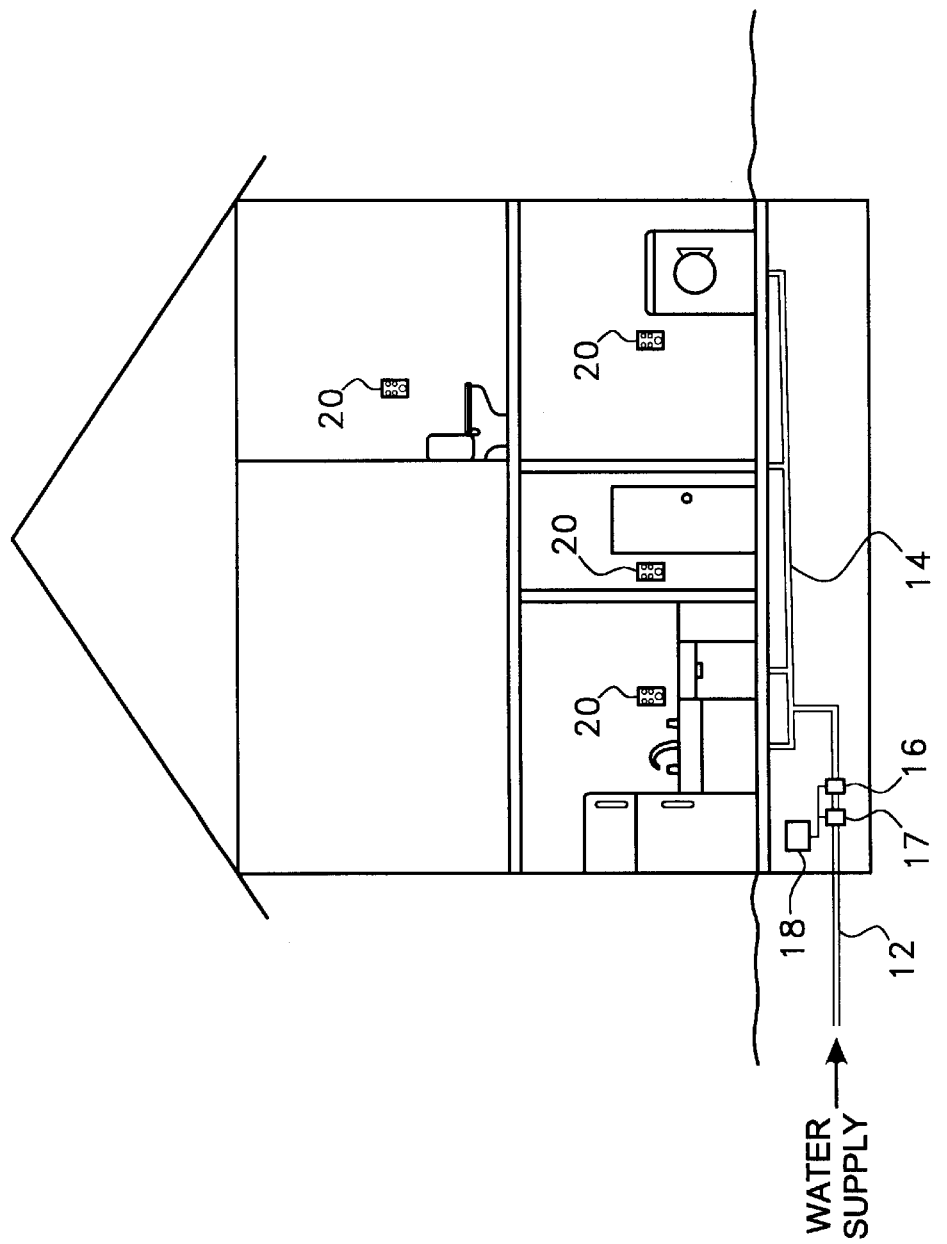
FIG. 1 is a schematic of a house containing the present invention system.

Referring to FIG. 1, an exemplary embodiment of flood prevention system is shown in accordance with the present invention. In FIG. 1, a residential home is shown. The home is supplied with water through an underground supply pipe 12. Once in the residential home, the water supply pipe 12 feeds water to the supply plumbing 14 of the home, wherein water is supplied to sinks, dishwashers, toilets, washing machines and the like.

The present invention system includes a shut-off valve 16 positioned in-line with the water supply pipe 12. The shut-off valve 16 is positioned so as to prevent the flow of water into any of the supply plumbing 14 within the house. The shut-off valve 16 is a solenoid valve or equivalent valve that can be instructed to open and close electrically.

The shut-off valve 16 is connected to a control housing 18. The control housing 18 contains the systems controller that selectively operates the shut-off valve 16 depending upon signals from a flow meter 17. Control panels 20 are remotely positioned throughout the house. The control panels 20 communicate with the control housing 18 through either a hard-wired interconnection or a remote radio interconnection. The control panels 20 are preferably positioned near the doors of the house and near flood prone areas, such as the laundry room, kitchen and/or bathrooms.

Figure 2:
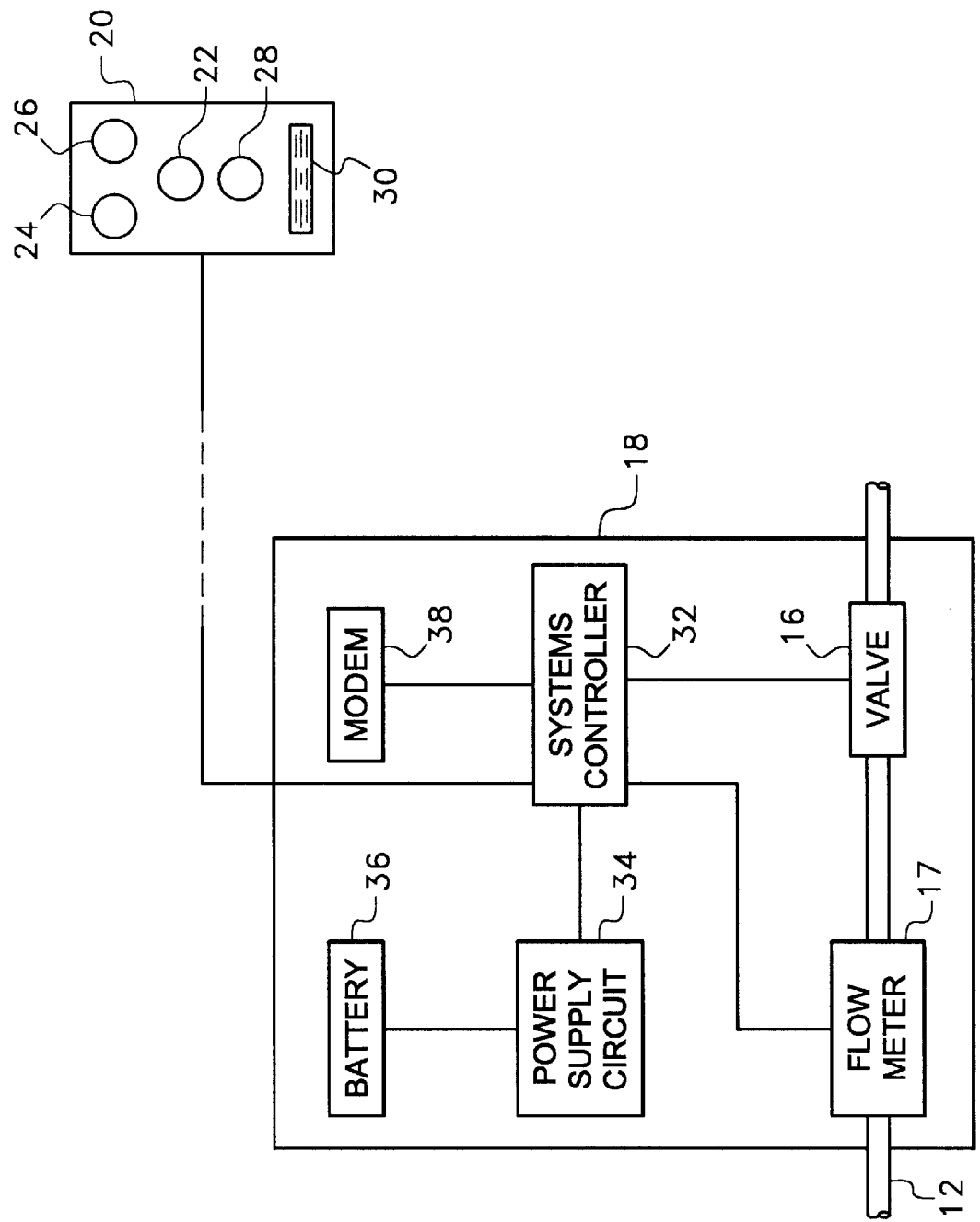
FIG. 2 is a schematic of the components comprising the present invention system.

The control panels 20 are used to activate or deactivate the system. As will later be explained. Referring to FIG. 2, It can be seen that the control panels 20 contain a plurality of function buttons. The function buttons include an emergency shut-off button 22, a "home mode" button 24, an "away mode" button 26 and a reset button 28. The control panels 20 can also contain an audible and/or visual alarm 30.

The control panels 20 communicate with a central control housing 18. Within the central control housing 18 is located systems controller 32. To utilize the present invention system, a flow meter 17 and a shut-off valve 16 are placed in line with the water supply line 12 of the house. In the shown embodiment, the flow meter 17 and shut-off valve 16 are shown as two separate components. However, it should be understood that both the flow meter and the shut-off valve can be built into a single unit.

The flow meter 17 generates an electrical signal that is indicative of the volume of water flowing through the water supply line 12 during a given unit of time. The water flow rate measured by the flow meter 17 is supplied to the systems controller 32. The systems controller 32 is electrically interconnected with the shut-off valve 16, wherein the systems controller 32 controls the operation of the shut-off valve 16. When the systems controller 32 closes the shut-off valve 16, the flow of water into the house is completely stopped. Conversely, when the systems controller 32 opens the shut-off valve 16, the flow of water into the house from the water supply line 12 is unrestricted.

The systems controller 32 is powered by a power supply circuit 34 that obtains power from the wiring within the home. A back-up battery 36 is charged by the power supply circuit 34. Should power from the house to the power supply circuit 34 fail, power is immediately supplied to the systems controller 32 by the back-up battery 36. The systems controller 32 is also interconnected to a modem 38. The modem 38 is coupled to the telecommunication lines that extend to the house.

Figure 3:
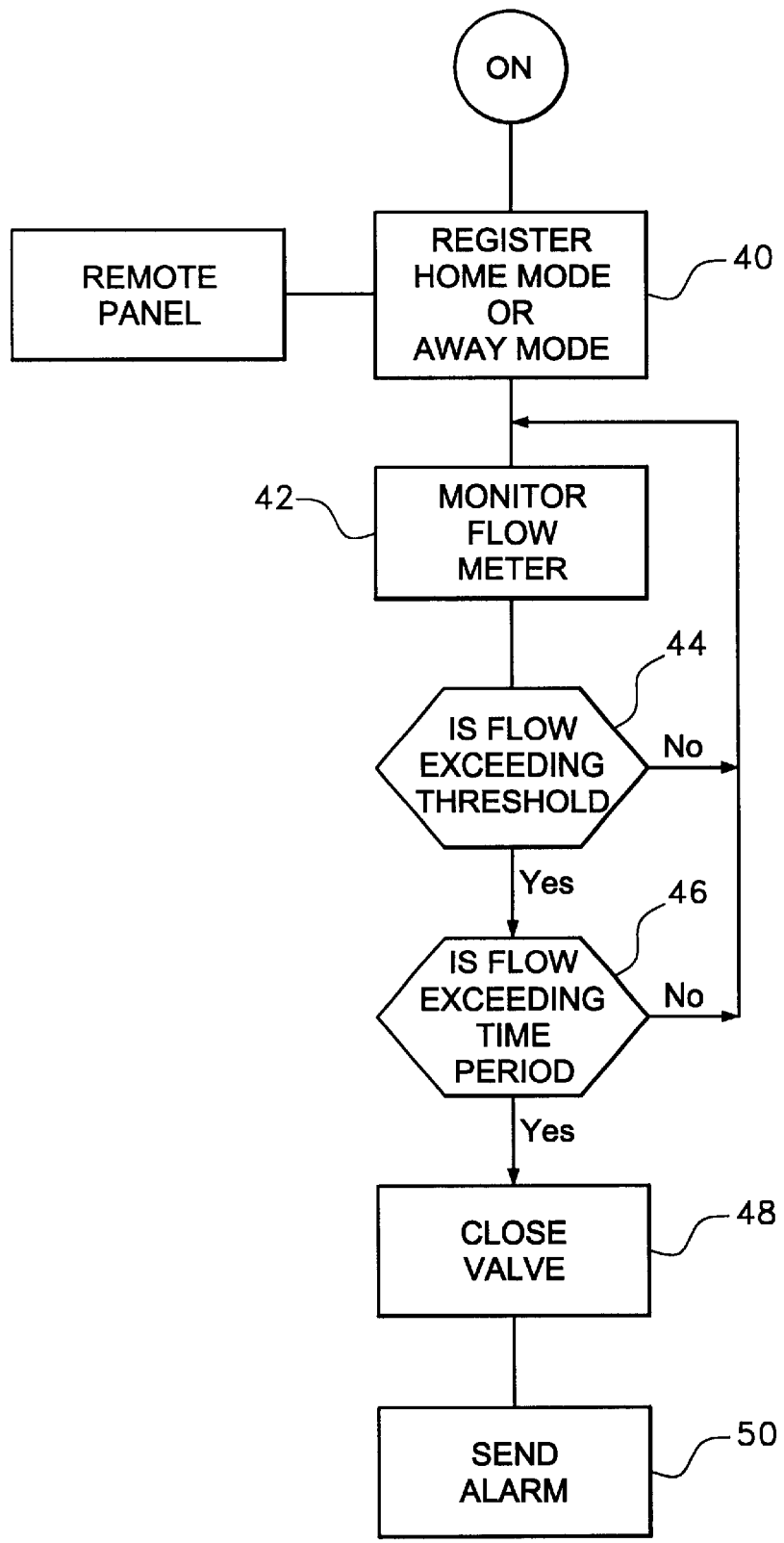
FIG. 3 is a block diagram schematic showing the method of operation for the present invention system.

The purpose of the present invention system is to prevent water from flowing into the water supply pluming of a house should that plumbing leak or should a fixture coupled to the plumbing begin to leak. The method of operation for the present invention can now be described by referring to FIG. 3 for the method steps and FIG. 2 for the functional components effected by the method steps.

The systems controller 32 operates in two modes, which are the "home mode" and the "away mode". The selection of modes can be made at any of the control panels 20 by pressing either the home function button 24 or the away function button 26. The method step of selecting an operational mode is shown by Block 40 in FIG. 3.

When in the home mode, the systems controller 32 monitors the flow meter 17 to detect if water flow is surpassing a first high flow rate. The first high flow rate is at least three gallons per minute. Using this flow rate threshold, most all appliances and fixtures that are supplied water can be operated at once. The first high flow rate can be adjusted to higher or lower water flow rate values depending upon the water consumption needs of the home in which the system is installed.

When in the home mode, the systems controller 32 monitors the flow meter 17 to detect if water flow is surpassing a second lower flow rate. The second lower flow rate is preferably below one gallon per minute. This enables a dishwasher to run or a washing machine to run without triggering an alarm. As such, a person can run the dishwasher or washing machine when they are not home or are asleep. Alternatively, the second lower flow rate may be zero. A zero flow rate can be selected if no appliances are to run while no one is home. Again, the second lower flow rate can be adjusted to a higher or lower water flow rate value depending upon the water consumption needs of the home in which the system is installed.

The "home mode" is selected when a person or persons are home in the house. The "away mode" is selected for when people are not home in the house or are asleep in the house. By positioning the control panels near the doors of the house, a person can easily change the operational mode of the system as that person enters or leaves the house.

If the systems controller 32 detects from the flow meter 17 that flow of water exceeds the threshold flow rate for the selected operational mode, the systems controller 32 permits the excess flow to continue for a predetermined period of time. The predetermined period of time preferably is less than one minute and is typically in the range of between ten seconds and thirty seconds. If the flow of water above the threshold value continues beyond this period of time, the systems controller 32 activates the shut-off valve 16 and stops the flow of water from the water supply pipe 12. The step of monitoring the water flow is shown by Block 42 in FIG. 3. The step of determining if the flow exceeds the threshold is shown by Block 44 in FIG. 3. The step of determining if the excessive flow exceeds a time period is shown by Block 46 in FIG. 3. Lastly, the step of closing the shut-off valve 16 is shown by Block 48 in FIG. 3.

The use of a predetermined time period, prior to the activation of the shut-off valve 16 enables toilets to refill when in the "away mode" and enables people to fill wash buckets with the water hose when in the "home mode". Typically as water evaporates from toilets, the water level in toilet descends until the fill valve in the toilet is opened and the toilet refills. The refilling of the toilet to the proper level typically only takes a few seconds. By allowing flow for this period of time, the present invention system will not prevent toilets from refilling when in the "away mode".

However, if the excessive flow of water exceeds the predetermined period of time, an alarm is sounded. See Block 50 in FIG. 3. The alarm is directed to each of the control panels 20 so that a person at home is aware of the alarm condition. If an alarm occurs while the system is in the "away mode", the systems controller 32 can utilize the modem 38 to dial a preprogrammed number with an alarm message. If the home has a monitored alarm system, the systems controller 32 can direct an alarm signal to the monitored alarm system. The company monitoring the alarm system will then have an indication that a flood condition has been detected and that the water supply to the house has been turned off.

In addition to the "away mode" and "home mode" of operation, the present invention system can be manually controlled. Referring back to FIG. 1, it can be seen that an emergency shut off function button 22 is present on each control panel 20. When this function button 22 is pressed, the systems controller 32 immediately closes the shut-off valve 16 and stops water flow. As such, if a person sees that a toilet is about to overflow, the flow of water feeding the toilet can be immediately stopped.

Also disposed on each control panel 20 is a reset function button 28. The reset function button 28 enables a person to reopen the shut-off valve 16 and resume normal operations after the emergency shut-off button 22 has been depressed.

It will be understood that the embodiment of the present invention described and illustrated herein is merely exemplary and a person skilled in the art can make many variations to the embodiment shown without departing from the scope of the present invention. All such variations, modifications and alternate embodiments are intended to be included within the scope of the present invention as defined by the appended claims.

What is claimed is:

1. A system for controlling the flow of water through a water supply pipe into a building, said system comprising:
    a valve connectable to the water supply line, wherein said valve has a closed condition that is capable of stopping water flow through the water supply line and an open condition that permits water flow through the water supply line;
    a flow meter connectable to the water supply line, wherein said flow meter produces a water flow signal indicative of the volume of water flowing through the water supply line when connected to the water supply line;
    a systems controller having a first operations mode and a second operations mode, said systems controller being coupled to both said valve and said flow meter, wherein said systems controller reads said water flow signal from said flow meter and closes said valve at a first flow rate, when in said first operations mode, and closes said valve at a second flow rate, when in said second operations mode, and wherein said first flow rate and said second flow rate are different.

2. The system according to claim 1, wherein said systems controller closes said valve when in said first operations mode only when flow through the water supply line surpasses said first flow rate for a first predetermined period of time.

3. The system according to claim 2, wherein said systems controller closes said valve when in said second operations mode only when flow through the water supply line surpasses said second flow rate for a second predetermined period of time.

4. The system according to claim 1, wherein said first predetermined period of time and said second predetermined period of time are both less than one minute.

5. The system according to claim 1, wherein said first flow rate is between zero gallons per minute and one gallon per minute.

6. The system according to claim 1, wherein said first flow rate is zero gallons per minute.

7. The system according to claim 1, wherein said second flow rate is above three gallons per minute.

8. The system according to claim 1, further including at least one control panel that contains controls for selectively selecting between said first operations mode and said second operations mode.

9. The system according to claim 8, wherein said at least one control panel is remote from said systems controller.

10. The system according to claim 8, wherein said at least one control panel contains an alarm that is activated when said systems controller closes said valve.

11. The system according to claim 8, wherein said at least one control panel includes an emergency button that, when activated, causes said systems controller to immediately close said valve.

12. The system according to claim 11, wherein said at least one control panel includes a reset button that, when activated, cause s said systems controller to open said valve.

13. The system according to claim 1, further including a back-up battery power source coupled to said systems controller.

14. A method of controlling the flow of water into a building from a water supply line, said method comprising the steps of:
    attaching a flow meter to the water supply line;
    attaching a valve to the water supply line, wherein said valve is capable of stopping flow through the water supply line;
    monitoring the flow meter with a systems controller, wherein said systems controller is selectively configurable between a first operating mode and a second operating mode;
    having the systems controller close said valve if said systems controller is in said first operating mode and the flow through the water supply line surpasses a first flow rate for longer than a first period of time;
    having the systems controller close said valve if said systems controller is in said second operating mode and the flow through the water supply line surpasses a second flow rate for longer than a second period of time, wherein said first flow rate and said second flow rate differ.

15. The method according to claim 14, further including the step of sounding at least one alarm when said systems controller closes said valve.

16. A system for preventing flood damage in a home caused by a leak, said system including:
    a flow meter that monitors water flow volume into a home;
    a valve to selectively stop water flow into the home;
    a controller coupled to said valve and said flow meter that selectively shuts said valve if the water flow volume surpasses a maximum threshold volume for longer than a predetermined period of time, said controller having a first operations mode and a second operations mode, wherein when in said first operations mode said maximum threshold volume has a first value and when in said second operations mode said maximum threshold volume has a higher second value.

17. The system according to claim 16, wherein said predetermined period of time is at least ten seconds.

* * * * *